United States Patent
Liu

(10) Patent No.: US 12,192,762 B2
(45) Date of Patent: Jan. 7, 2025

(54) METHOD AND APPARATUS FOR AUTHENTICATING TERMINAL, COMPUTER DEVICE AND STORAGE MEDIUM

(71) Applicant: TENCENT TECHNOLOGY (SHENZHEN) COMPANY LTD, Guangdong (CN)

(72) Inventor: Guoxu Liu, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 244 days.

(21) Appl. No.: 17/984,803

(22) Filed: Nov. 10, 2022

(65) Prior Publication Data

US 2023/0076147 A1    Mar. 9, 2023

Related U.S. Application Data

(63) Continuation of application No. PCT/CN2021/126402, filed on Oct. 26, 2021.

(30) Foreign Application Priority Data

Nov. 30, 2020  (CN) .......................... 202011373544.4

(51) Int. Cl.
  *H04L 29/06* (2006.01)
  *H04W 12/069* (2021.01)
  *H04W 12/106* (2021.01)
(52) U.S. Cl.
  CPC ....... *H04W 12/069* (2021.01); *H04W 12/106* (2021.01)
(58) Field of Classification Search
  None
  See application file for complete search history.

(56) References Cited

U.S. PATENT DOCUMENTS

| | | | |
|---|---|---|---|
| 10,169,587 B1* | 1/2019 | Nix | H04W 12/041 |
| 2007/0197190 A1* | 8/2007 | Tang | H04W 36/0038 |
| | | | 455/410 |

(Continued)

FOREIGN PATENT DOCUMENTS

| CN | 110198539 A | 9/2019 |
|---|---|---|
| CN | 110856174 A | 2/2020 |

(Continued)

OTHER PUBLICATIONS

Yu, Dingguo; Chen, Nan. The Improving of IKE with PSK for Using in Mobile Computing Environments. 2009 Fifth International Conference on Information Assurance and Security. https://ieeexplore.ieee.org/stamp/stamp.jsp?tp=&arnumber=5284076 (Year: 2009).*

(Continued)

*Primary Examiner* — Jeremiah L Avery
(74) *Attorney, Agent, or Firm* — Sughrue Mion, PLLC

(57) ABSTRACT

Provided are a method and an apparatus for authenticating a terminal, a computer device, and a storage medium. The method includes: receiving an authentication request of a request terminal including a first media access control address and a first message integrity code of the request terminal; determining a target key-value pair from key-value pairs based on the first media access control address, and determining at least one first preshared key corresponding to the first media access control address from the target key-value pair, the media access control address in any of the key-value pairs being a historical successfully-authenticated address; generating a second message integrity code corresponding to each of the at least one first preshared key, one first preshared key corresponding to one second message integrity code; and authenticating the request terminal based on the first message integrity code and the at least one second message integrity code.

19 Claims, 12 Drawing Sheets

(56) References Cited

U.S. PATENT DOCUMENTS

| | | | | |
|---|---|---|---|---|
| 2007/0280481 | A1* | 12/2007 | Eastlake | H04W 12/50 |
| | | | | 380/277 |
| 2009/0103731 | A1* | 4/2009 | Sarikaya | H04L 9/3236 |
| | | | | 726/14 |
| 2011/0154039 | A1* | 6/2011 | Liu | H04L 63/0869 |
| | | | | 713/168 |
| 2011/0252239 | A1* | 10/2011 | Lai | H04L 9/0838 |
| | | | | 713/168 |
| 2013/0318572 | A1* | 11/2013 | Singh | H04W 84/12 |
| | | | | 726/4 |
| 2016/0212695 | A1* | 7/2016 | Lynch | H04W 28/0268 |
| 2017/0093866 | A1* | 3/2017 | Ben-Noon | H04W 12/068 |
| 2017/0230824 | A1* | 8/2017 | Li | H04L 63/123 |
| 2017/0310475 | A1* | 10/2017 | Hu | H04L 63/0869 |
| 2018/0041930 | A1* | 2/2018 | Hampel | H04L 63/10 |
| 2018/0123804 | A1* | 5/2018 | Smith | H04L 63/0428 |
| 2018/0338244 | A1* | 11/2018 | Singhal | H04L 9/3247 |
| 2019/0349254 | A1* | 11/2019 | Nolan | H04L 67/1093 |
| 2020/0334924 | A1* | 10/2020 | Wells | H04L 67/04 |
| 2021/0099873 | A1* | 4/2021 | Windsor | H04L 63/0892 |
| 2021/0250759 | A1* | 8/2021 | Ziv | H04W 12/75 |
| 2024/0323034 | A1* | 9/2024 | Kumar | H04L 9/3268 |

FOREIGN PATENT DOCUMENTS

| | | |
|---|---|---|
| CN | 111866881 A | 10/2020 |
| CN | 112566119 A | 3/2021 |

OTHER PUBLICATIONS

Noh, Jaewon et al. Secure Authentication and Four-Way Handshake Scheme for Protected Individual Communication in Public Wi-Fi Networks. IEEE Access, vol. 6. https://ieeexplore.ieee.org/stamp/stamp.jsp?tp=&arnumber=8314146 (Year: 2018).*

Chinese Office Action dated Apr. 29, 2024 in Application No. 202011373544.4.

International Search Report for PCT/CN2021/126402 dated Dec. 27, 2021.

Written Opinion for PCT/CN2021/126402 dated Dec. 27, 2021.

* cited by examiner

<PRIOR ART>

METHOD AND APPARATUS FOR AUTHENTICATING TERMINAL, COMPUTER DEVICE AND STORAGE MEDIUM

CROSS-REFERENCE TO RELATED APPLICATION(S)

This application is a continuation application of International Application No. PCT/CN2021/126402, filed Oct. 26, 2021, which claims priority to Chinese Patent Application No. 202011373544.4 filed on Nov. 30, 2020, the disclosures of which are herein incorporated by reference in their entireties.

FIELD

The disclosure relates to the technical field of computers, and in particular to a method and apparatus for authenticating a terminal, a computer device, a storage medium and a computer program product.

BACKGROUND

At present, when using a wireless fidelity (WiFi) for networking, a user typically selects a WiFi name to be connected and inputs a password. In a networking process as shown in FIG. 1, an authenticator, also named as an access point (AP) device, can perform user identity authentication based on four-way handshake of an extensible authentication protocol over LAN (EAPOL). Generally speaking, when a service set identifier (SSID) corresponds to a preshared key (PSK) which has been connected, the authenticator can validate a PSK of a user according to a calculated pairwise master key (PMK) so as to finish identity authentication, and the user can have access to WiFi to surf the Internet after later authentication succeeds. But when one SSID corresponds to multiple private preshared key (PPSK) lists (the PPSK lists may include all PSKs connected by the SSID), the authenticator needs to authenticate the user by traversing all the PPSK lists, thereby causing low authentication efficiency, low speed and low user experience degree when the access quantity of users is too high.

SUMMARY

An aspect of an example embodiment of the disclosure provides a method for authenticating a terminal, executed by a computer device, including:
  receiving an authentication request of a request terminal, the authentication request including a first media access control address and a first message integrity code of the request terminal;
  determining a target key-value pair from a plurality of key-value pairs based on the first media access control address, and determining at least one first preshared key corresponding to the first media access control address from the target key-value pair, any of the plurality of key-value pairs comprising a media access control address of a terminal and at least one historical preshared key which has been connected by the terminal, and the media access control address of the terminal in any of the plurality of key-value pairs being a historical successfully-authenticated address;
  generating at least one second message integrity code corresponding to each of the at least one first preshared key, one first preshared key corresponding to one second message integrity code; and
  authenticating the request terminal based on the first message integrity code and the at least one second message integrity code.

An aspect of an example embodiment of the disclosure provides an apparatus for authenticating a terminal, including at least one memory configured to store program code; and at least one processor configured to read the program code and operate as instructed by the program code, the program code including:
  receiver code configured to cause the at least one processor to receive an authentication request of a request terminal, the authentication request including a first media access control address and a first message integrity code of the request terminal;
  acquisition code configured to cause the at least one processor to determine a target key-value pair from a plurality of key-value pairs based on the first media access control address, and determine at least one first preshared key corresponding to the first media access control address from the target key-value pair, any of the plurality of key-value pairs comprising a media access control address of a terminal and at least one historical preshared key which has been connected by the terminal, and the media access control address of the terminal in any of the plurality of key-value pairs being a historical successfully-authenticated address;
  generation code configured to cause the at least one processor to generate at least one second message integrity code corresponding to each of the at least one first preshared key, one first preshared key corresponding to one second message integrity code; and
  authentication code configured to cause the at least one processor to authenticate the request terminal based on the first message integrity code and the at least one second message integrity codes.

An aspect of an example embodiment of the disclosure provides a computer device, including: a processor, a memory, and a network interface; the processor being connected to the memory and the network interface, the network interface being configured to provide a data communication function, the memory being configured to store program instructions, and the processor being configured to perform the program instructions to implement the method for authenticating a terminal according to the embodiments of the disclosure.

An aspect of an example embodiment of the disclosure provides a non-transitory computer-readable storage medium, storing a computer program, the computer program including program instructions, the program instructions, when executed by a processor, implementing the method for authenticating a terminal according to the embodiments of the disclosure.

An embodiment of the disclosure provides a computer program product or a computer program, the computer program product or the computer program including computer instructions (program instructions), the computer instructions being stored in a computer-readable storage medium. A processor of a computer device reads the computer instructions from the computer-readable storage medium, and executes the computer instructions, to cause the computer device to implement the method for authenticating a terminal according to the embodiment of the disclosure.

BRIEF DESCRIPTION OF THE DRAWINGS

To describe the technical solutions in the embodiments of the disclosure more clearly, the following briefly introduces the accompanying drawings required for describing the embodiments. Apparently, the accompanying drawings in the following description show merely some embodiments of the disclosure, and a person of ordinary skill in the art may still derive other drawings from these accompanying drawings without creative efforts.

DETAILED DESCRIPTION

The technical solutions in the embodiments of the disclosure are clearly and completely described below with reference to the accompanying drawings in the embodiments of the disclosure. Apparently, the described embodiments are merely some rather than all of the embodiments of the disclosure. All other embodiments obtained by a person skilled in the art based on the embodiments of the disclosure without creative efforts shall fall within the protection scope of the disclosure. In the following description, the involved term "multiple" means at least two, and in a similar way, the term "multiple sets" means at least two sets.

Figure 1:
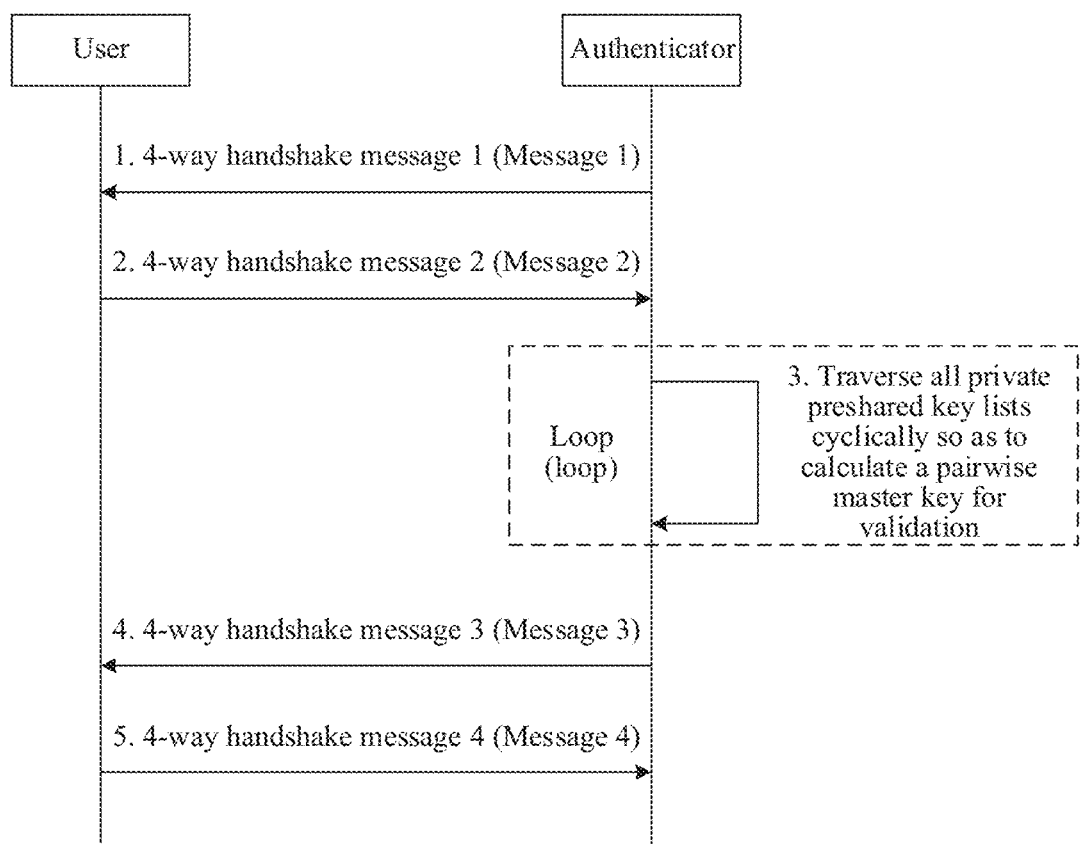
FIG. 1 is a schematic flowchart of identity authentication on a user by an authenticator.
Figure 2:
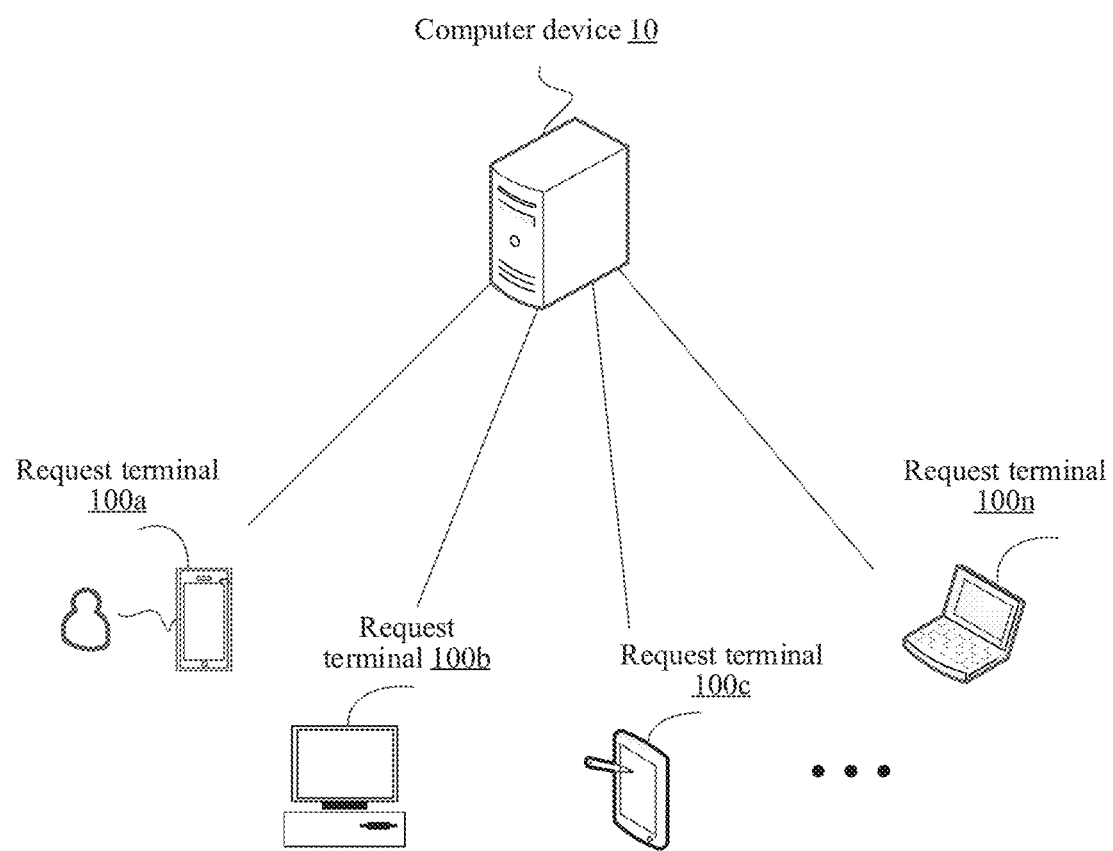
FIG. 2 is a schematic structural diagram of a network architecture provided by an embodiment of the disclosure.

FIG. 2 is a schematic structural diagram of a network architecture provided by an embodiment of the disclosure. As shown in FIG. 2, the network architecture may include a computer device 10 and a request terminal cluster. The request terminal cluster may include multiple request terminals, and as shown in FIG. 2, may include a request terminal 100a, a request terminal 100b, a request terminal 100c, . . . , a request terminal 100n.

The computer device 10 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. Each request terminal in the request terminal cluster may include, but is not limited to: a camera, an attendance machine, a monitor, a smart phone, a tablet personal computer, a notebook computer, a desk computer, a smart speaker, a smart watch, etc.

It is to be understood that the computer device 10 in the embodiment of the disclosure may be an authentication terminal with an authentication function for the request terminals. The authentication terminal may include, but is not limited to: a camera, an attendance machine, a monitor, a smart phone, a tablet personal computer, a notebook computer, a desk computer, a smart speaker, a smart watch, etc.

As shown in FIG. 2, the request terminal 100a, the request terminal 100b, the request terminal 100c, . . . , the request terminal 100n may be separately in network connection to the computer device 10 so that each request terminal may be in data interaction with the computer device 10 through network connection. For example, the computer device 10 is a back-end server of a specific network (such as a specific wireless network). The computer device 10 may authenticate the request terminal 100a when receiving an authentication request of any request terminal (such as the request terminal 100a) in the request terminal cluster, and allow the request terminal 100a to have access to the specific network after successful authentication.

In some embodiments, the computer device 10 may achieve the method for authenticating a terminal provided by the embodiment of the disclosure by operating a computer program. For example, the computer program may be an original program or a software module in an operating system. The computer program may be a native application (APP) which may run after being installed in the operating system. The computer program may be a mini program which may run as long as being downloaded to a browser environment. The computer program may be a mini program capable of being inserted into any APP. In a word, the computer program may be APPs, modules or plugin in any form.

An application scenario of the embodiment of the disclosure may be a terminal authentication scenario (such as an enterprise office scenario or a scenario in which a user has access to a home wireless network) of multiple preshared keys. The application scenario in the embodiment of the disclosure may be other application scenarios, which are not particularly limited herein.

Figure 3:
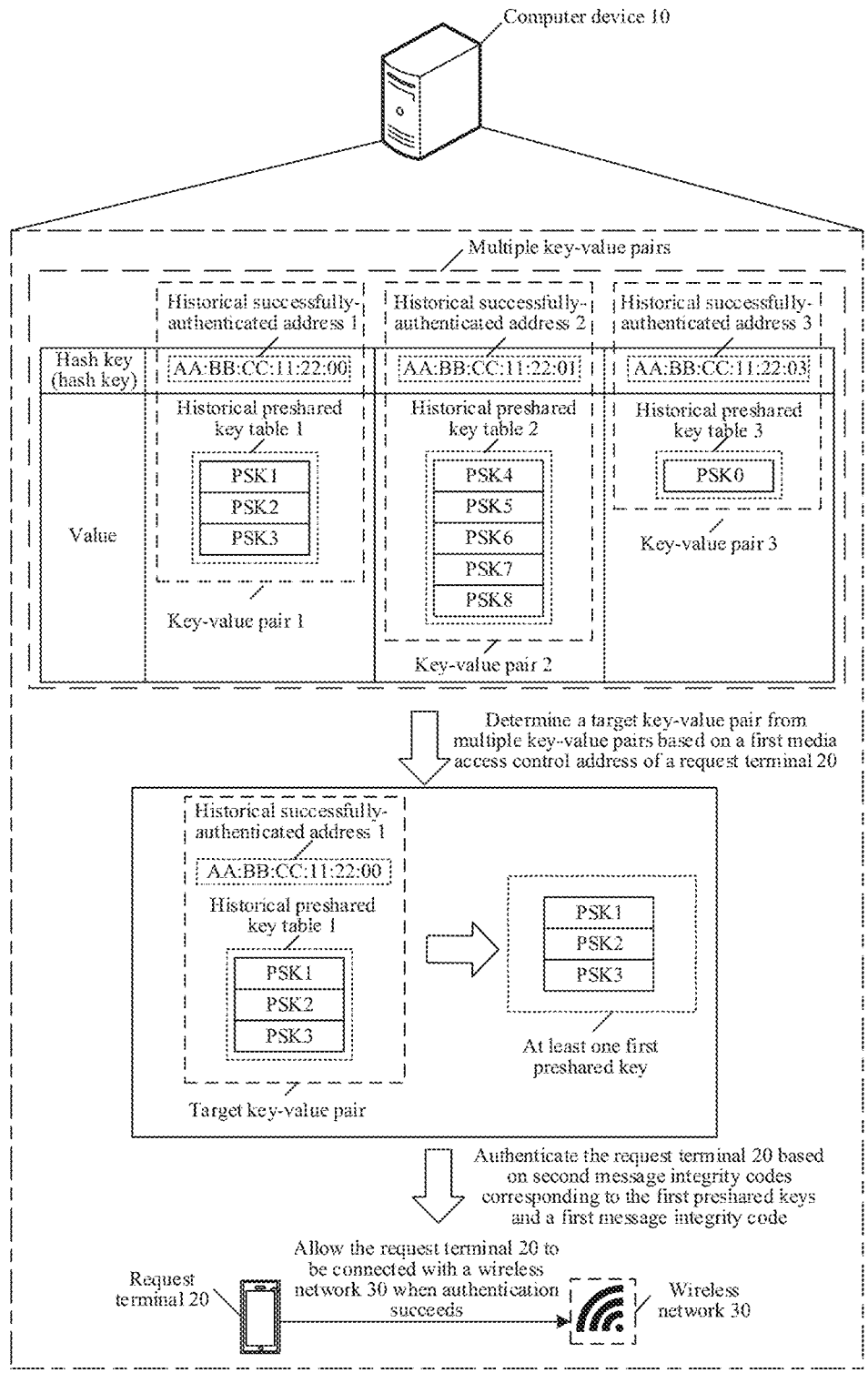
FIG. 3 is a schematic scenario diagram of request terminal identity authentication provided by an embodiment of the disclosure.

To facilitate understanding, FIG. 3 is a schematic scenario diagram of request terminal identity authentication provided by an embodiment of the disclosure. To facilitate description, conditions that a computer device (such as a computer device 10) stores key-value pairs corresponding to multiple terminals (such as a key-value pair 1 corresponding to a terminal 1, a key-value pair 2 corresponding to a terminal 2 and a key-value pair 3 corresponding to a terminal 3) are exemplarily described below. The computer device 10 here may be a back-end server of a wireless network 30. In the embodiment of the disclosure, preshared keys which have been connected by historical successfully-authenticated terminals may be generally named as historical preshared keys. Media access control addresses of the historical successfully-authenticated terminals may be generally named as historical successfully-authenticated addresses. As shown in FIG. 3, the computer device 10 may take a historical successfully-authenticated address 1 of the terminal 1 as a hash key of the key-value pairs, generates a historical preshared key list 1 according to the historical preshared keys which have been connected by the terminal 1, and takes the preshared key list 1 as values of the key-value pair 1 so as to generate the key-value pair 1. The historical preshared key list 1 may include one or more historical preshared keys, and for example may include 3 historical preshared keys (such as PSK1, PSK2 and PSK3). In a similar way, in the key-value pair 2 corresponding to the terminal 2, a hash key may be a historical successfully-authenticated address 2 of the terminal 2. Values may be in a historical preshared key list 2. The historical preshared key list 2 includes historical preshared keys which have been connected by the terminal 2. The historical preshared key list 2 may include one or more historical preshared keys, and for example may include 5 historical preshared keys (such as PSK4, PSK5, PSK6, PSK7 and PSK8). In a similar way, in the key-value pair 3 corresponding to the terminal 3, a hash key may be a historical successfully-authenticated address 3 of the terminal 3. Values may be in a historical preshared key list 3. The historical preshared key list 3 includes historical preshared keys which have been connected by the terminal 3. The historical preshared key list 3 may include one or more historical preshared keys, and for example may include 1 historical preshared key (such as PSK0).

When receiving an authentication request transmitted by a request terminal 20, the computer device 10 may determine a target key-value pair (such as the key-value pair 1) from the key-value pair 1, the key-value pair 2 and the key-value pair 3 based on a first media access control address of the request terminal 20 in the authentication request, and determine at least one first preshared key (such as PSK1, PSK2 and PSK3) corresponding to the first media access control address in the key-value pair 1. The authentication request may carry a message integrity code (MIC) generated by the request terminal 20. The embodiment of the disclosure may generally call the message integrity code generated by the request terminal as a first message integrity code. The computer device 10 may generate message integrity codes corresponding to the first preshared keys in PSK1, PSK2 and PSK3. The embodiment of the disclosure may generally call the message integrity codes generated based on the first preshared keys as second message integrity codes. For example, PSK1 corresponds to the second message integrity code 1, PSK2 corresponds to the second message integrity code 2, and PSK3 corresponds to the second message integrity code 3. At the time, the computer device 10 may authenticate the request terminal 20 based on the second message integrity code 1, the second message integrity code 2, the second message integrity code 3 and the first message integrity code. When the request terminal 20 is successfully authenticated, the computer device 10 may allow the request terminal 20 to be connected with the wireless network 30 for communication.

It follows that the computer device may rapidly search the multiple key-value pairs for all the first preshared keys which have been connected by the request terminal based on the first media access control address, thereby rapidly generating the second message integrity codes to authenticate the request terminal and then improving authentication efficiency and a user experience degree.

Reference may be made to embodiments corresponding to FIG. 4 to FIG. 12 for an example achieving mode for identity authentication on a request terminal by a computer device.

Figure 4:
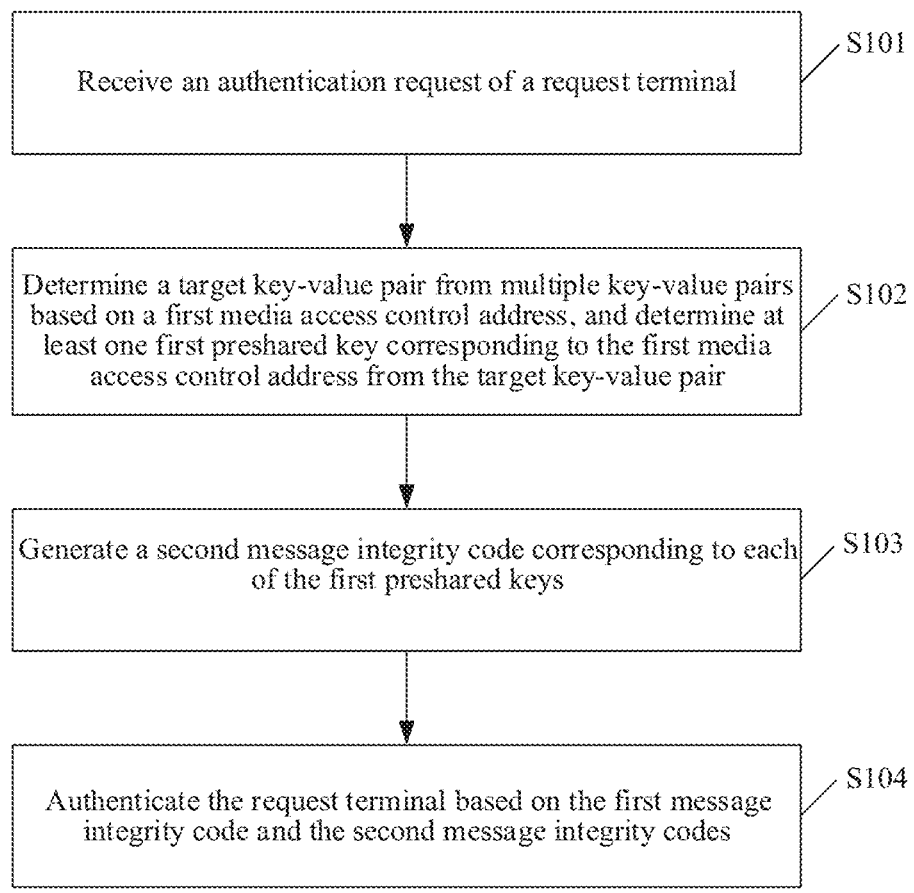
FIG. 4 is a schematic flowchart of a method for authenticating a terminal provided by an embodiment of the disclosure.

FIG. 4 is a schematic flowchart of a method for authenticating a terminal provided by an embodiment of the disclosure. The method for authenticating a terminal may be achieved by a computer device and may include the following S101 to S104:

S101: Receive an authentication request of a request terminal, the authentication request carrying a first media access control address and a first message integrity code of the request terminal.

Figure 5:
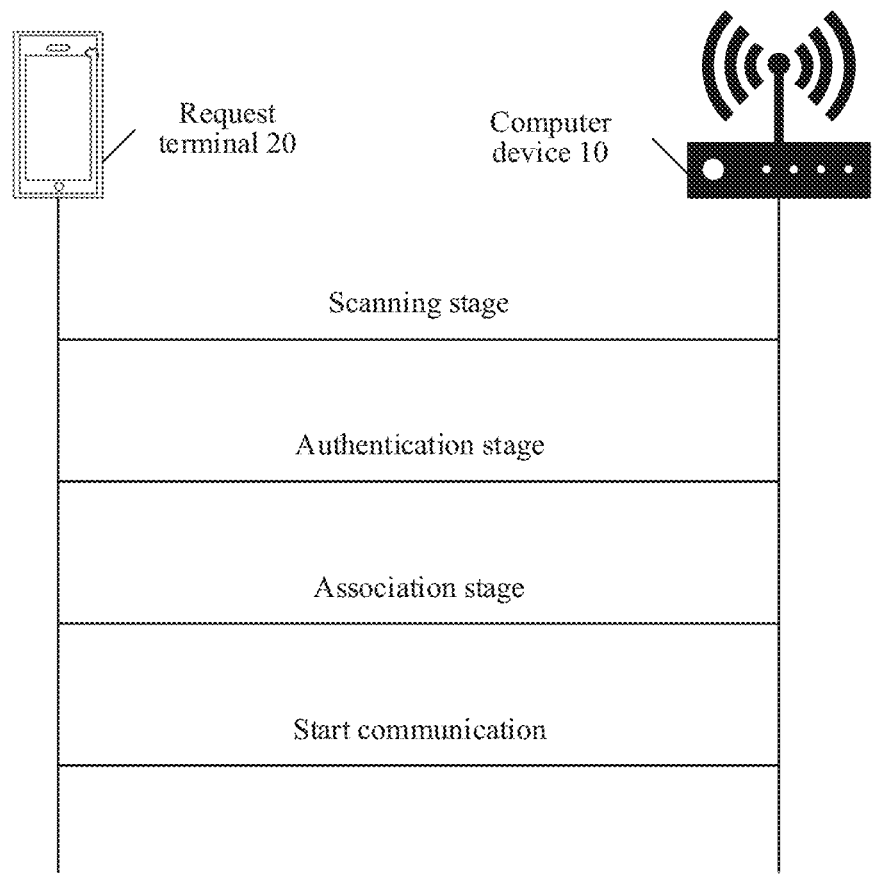
FIG. 5 is a schematic diagram of identity authentication on a request terminal by a computer device provided by an embodiment of the disclosure.

In some example embodiments, when a request terminal requests access to a service set (such as a home wireless network or an enterprise office network), a computer device may perform identity authentication on the request terminal. To facilitate description, an identity authentication process of the request terminal is exemplarily described in combination with FIG. 5. FIG. 5 is a schematic diagram of identity authentication on a request terminal by a computer device provided by an embodiment of the disclosure. As shown in FIG. 5, a process of identity authentication on the request terminal 20 by the computer device 10 may include a scanning stage, an authentication stage and an association stage. The computer device 10 may start to communicate with the request terminal 20 after the association stage. At the scanning stage, the request terminal 20 may search for a WiFi hot spot through different scanning modes. The scanning modes may include an active scanning mode and a passive scanning mode. In the active scanning mode, the request terminal 20 may transmit a probe request frame on each channel and acquire WiFi hot spot information from received probe response frames. In the passive scanning mode, the request terminal 20 may monitor beacon frames (the beacon frames herein may include wireless network information) periodically transmitted by the computer device 10, and acquire WiFi hot spot information through the wireless network information in the beacon frames. Unhidden type WiFi hot spots include service set identifiers. Hidden type WiFi hot spots do not include service set identifiers. When scanning multiple WiFi hot spots with the same service set identifiers with the above-mentioned service set, the request terminal 20 determines one WiFi hot spot with the highest signal intensity from the multiple WiFi hot spots and enters the authentication stage. A back-end server corresponding to the WiFi hot spot with the highest signal intensity may be the computer device 10 in the embodiment of the disclosure.

Figure 6:
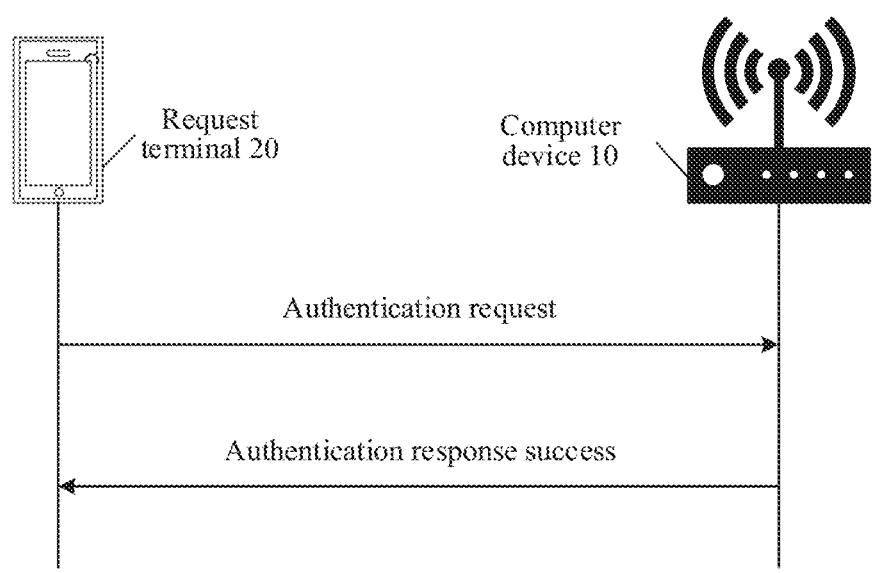
FIG. 6 is a schematic interaction diagram of open-system authentication provided by an embodiment of the disclosure.

In some example embodiments, at an authentication stage, a computer device may perform identity authentication on a request terminal based on different authentication modes. The authentication modes herein may include an open-system authentication mode, a shared-key authentication mode, a WiFi protected access pre-shared key/WPA2-PSK authentication mode, and an 802.1X extensible authentication protocol (EAP) authentication mode. The shared-key authentication mode means that the computer device determines whether an identity of a request terminal is legal or not by judging whether the request terminal has the same key or not. A key encryption mode may be of wired equivalent privacy (WEP) capable of preventing an illegal request terminal from eavesdropping or invading a wireless network (namely, a WiFi hot spot) corresponding to the computer device. To facilitate description, the open-system authentication mode is exemplarily described in combination with FIG. 6. FIG. 6 is a schematic interaction diagram of open-system authentication provided by an embodiment of the disclosure. As shown in FIG. 6, the open-system authentication mode is an acquiescent authentication mode of Institute of Electrical and Electronics Engineering (IEEE) 802.11 and may achieve direct connection with a password, and therefore the computer device 10 may transmit an authentication result to the request terminal 20 when receiving an authentication request message including identity statements and transmitted by the request terminal 20. For example, when the authentication result indicates a successful identity validation response, it means that the computer device 10 and the request terminal 20 succeed in mutual authentication.

Figure 7:
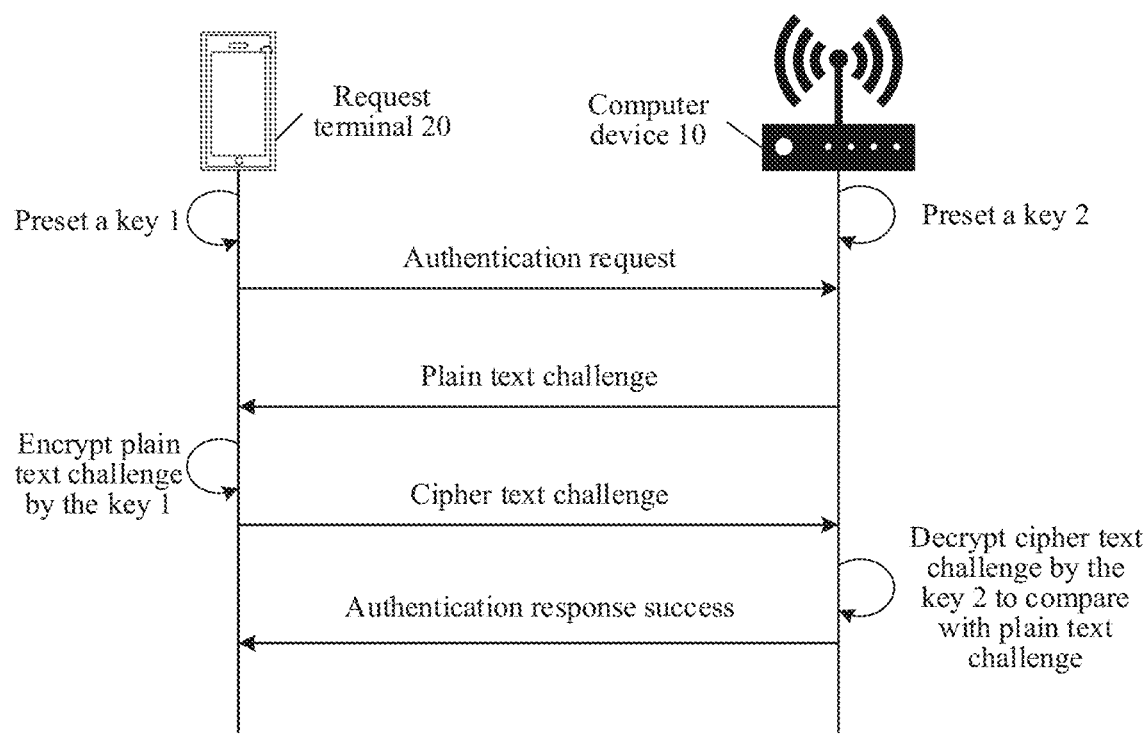
FIG. 7 is a schematic interaction diagram of WPAPSK/WPAPSK2 authentication provided by an embodiment of the disclosure.

To facilitate description, the WPAPSK/WPAPSK2 authentication mode is exemplarily described in combination with FIG. 7. FIG. 7 is a schematic interaction diagram of WPAPSK/WPAPSK2 authentication provided by an embodiment of the disclosure. As shown in FIG. 7, a computer device 10 may periodically transmit beacon frames to a request terminal 20 so that the request terminal 20 may update a WiFi hot spot list based on wireless network information in the beacon frames. The request terminal 20 broadcasts probe request frames on each channel (such as 1-13 channels). The corresponding computer device 10 in each channel may transmit probe response frames to the request terminal 20. The probe response frames herein may include service set identifier and robust security network (RSN) information. The request terminal 20 may determine a WiFi hot spot with the highest signal intensity from the probe response frames of the corresponding computer device 10 in each channel and transmit an authentication packet to the computer device 10 corresponding to the WiFi hot spot with the highest signal intensity. The authentication packet herein may include an authentication request message. The authentication packet has two authentication types including an open type 0 and a share type 1. The authentication type of the authentication packet is the open type under the WPAPSK/WPAPSK2 authentication mode. After the authentication packet is received, the computer device 10 may transmit plain text data to the request terminal 20 based on the authentication request message. After receiving the plain text data, the request terminal 20 may encrypt the plain text data based on a key 1 preset in the request terminal 20 to obtain cipher text data and transmit the cipher text data to the computer device 10. The key 1 may be a password set when the request terminal 20 has access to the WiFi hot spot with the highest signal intensity. After receiving the cipher text data, the computer device 10 may decrypt the cipher text data based on a key 2 preset in the computer device 10 to obtain decrypted data. The key 2 herein may be a password stored by the computer device 10 when the request terminal 20 is connected with the WiFi hot spot with the highest signal intensity. When the decrypted data is the same as the plain text data, the computer device 10 may transmit an authentication packet about a successful identity authentication response to the request terminal 20 so as to indicate that the computer device 10 and the request terminal 20 succeed in mutual authentication.

In some example embodiments, at an association stage, a computer device may receive an association request packet transmitted by a request terminal and transmits an association response packet to the request terminal based on the association request packet. At the time, the computer device may authenticate the request terminal based on an EAPOL 4-way handshake. The computer device may generate and transmit second random numbers to the request terminal, and receives an authentication request transmitted by the request terminal based on the second random numbers. The authentication request may carry a first media access control (MAC) address, first random numbers and a first message integrity code of the request terminal. The first random numbers are herein generated by the request terminal. The first message integrity code is obtained by encrypting a pairwise transient key (PTK) based on an encryption algorithm through the request terminal. The pairwise transient key is obtained by calculating a pairwise master key through the request terminal based on the service set identifier and a target preshared key and performing key derivation on the pairwise master key, the first random numbers, the second random numbers, the first media access control address and a second media access control address of the computer device through a pseudo random function (PRF). The embodiment of the disclosure may generally call random numbers generated by the request terminal as first random numbers, and random numbers generated by the computer device as second random numbers.

S102: Determine a target key-value pair from multiple key-value pairs based on a first media access control address, and determine at least one first preshared key corresponding to the first media access control address from the target key-value pair.

In some example embodiments, a computer device may pre-store key-value pairs corresponding to multiple historical successfully-authenticated terminals. One terminal corresponds to one key-value pair. One key-value pair includes a media access control address of one terminal and at least one historical preshared key which has been connected by the terminal. The terminal media access control address (or the media access control address of the terminal) in any key-value pair is a historical successfully-authenticated address of the terminal. In some example embodiments, a computer device may take a historical successfully-authenticated address of any terminal as a hash key of a corresponding key-value pair, and historical preshared keys which have been connected by any terminal as values of the key-value pair so as to generate the key-value pair corresponding to any terminal. The computer device may store the multiple key-value pairs (such as a key-value pair 1 to a key-value pair 3 shown in FIG. 3) into a hash map, such as a hash map 1. The hash map is of a key-value pair type data structure, and may be used for searching for time complexity 0 (1). The hash map is conveniently searched for at least one first preshared key corresponding to the first media access control address so as to authenticate the request terminal, thereby improving authentication efficiency.

In some example embodiments, a computer device may determine a target key-value pair from multiple key-value pairs pre-stored in the hash map based on a first media access control address, and determine at least one first preshared key corresponding to the first media access control address from the target key-value pair. The embodiment of the disclosure may call the key-value pair inquired on the basis of the first media access control address as the target key-value pair and may also call the historical preshared keys which have been connected by the request terminal as the first preshared keys. For example in combination with FIG. 3, assuming that the hash map is the hash map 1, and the first media access control address and the historical successfully-authenticated address 1 are the same, the computer device may determine the target key-value pair (namely the key-value pair 1) from the key-value pair 1, the key-value pair 2 and the key-value pair 3 pre-stored in the hash map 1 based on the first media access control address, and take PSK1, PSK2 and PSK3 in the key-value pair 1 as the first preshared keys corresponding to the first media access control address.

S103: Generate a second message integrity code corresponding to each of the first preshared keys.

In some example embodiments, a computer device may determine a target pairwise master key corresponding to any first preshared key based on any first preshared key and a service set identifier. The service set identifier is an identifier of a service set requested to be connected by the request terminal. At the time, the computer device may determine a target pairwise transient key corresponding to any first preshared key based on the target pairwise master key, first random numbers, second random numbers, the first media access control address and the second media access control address of the computer device. The computer device may encrypt the target pairwise transient key to obtain a second message integrity code corresponding to any first preshared key, thereby obtaining second message integrity codes corresponding to the first preshared keys. It is to be understood that the computer device may determine a key confirmation key (KCK) in the target pairwise transient key, and encrypt the target pairwise transient key based on the key confirmation key through an advanced encryption standard (AES) algorithm to obtain the second message integrity code corresponding to any first preshared key. One first preshared key corresponds to one second message integrity code. For example, the computer device may take at least a part (such as first 128 bits) in the target pairwise transient key as key confirmation keys.

S104: Authenticate the request terminal based on the first message integrity code and the second message integrity codes.

In some example embodiments, when a target message integrity code the same as a first message integrity code is inquired from each of the second message integrity codes, it is determined that request terminal validation passes. The embodiment of the disclosure may generally call a message integrity code, the same as the first message integrity code, in the second message integrity codes or following third message integrity codes as the target message integrity code. When request terminal validation passes, the computer device may transmit a validation request to the request terminal. The validation request may carry the target message integrity code. When receiving an authentication confirmation message transmitted by the request terminal, the computer device may determine successful request terminal authentication and then may communicate with the request terminal at the time. The authentication confirmation message may be transmitted by the request terminal when the received target message integrity code is the same as the generated first message integrity code.

In some example embodiments, when no target message integrity code that is the same as a first message integrity code is inquired from each of second message integrity codes, historical preshared keys in various key-value pairs may be traversed to generate third message integrity codes corresponding to the traversed historical preshared keys. One historical preshared key corresponds to one third message integrity code. The embodiment of the disclosure may generally call message integrity codes generated based on the historical preshared keys as the third message integrity codes. When the target message integrity code the same as the first message integrity code is inquired from each of the third message integrity codes, the computer device determines that request terminal validation passes. After request terminal validation passes, the computer device may transmit a validation request carrying the target message integrity code to the request terminal. When receiving an authentication confirmation message transmitted by the request terminal, the computer device may determine successful request terminal authentication and then add the target preshared key to the target key-value pair so as to update the target key-value pair. On the contrary, when no target message integrity code the same as the first message integrity code is inquired from each of the third message integrity codes, the computer device may determine that request terminal authentication fails. At the time, the computer device may transmit an authentication failure message to the request terminal so as to display the authentication failure message on a user interface of the request terminal. Accordingly, a user may be prompted about authentication again, and the user experience degree is high.

Figure 8:
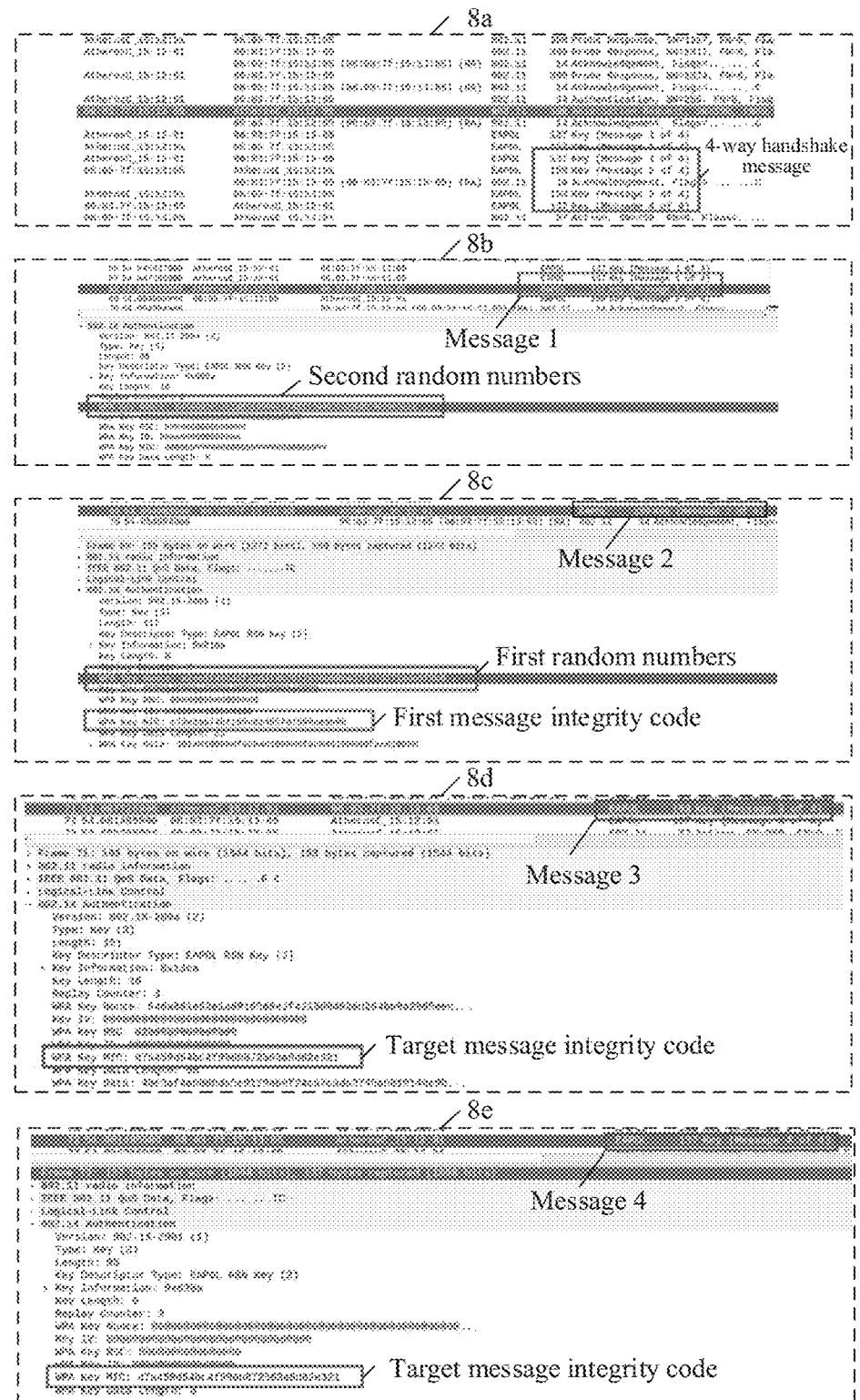
FIG. 8 is a schematic interface diagram of authentication on a request terminal by a computer device provided by an embodiment of the disclosure.
Figure 9:
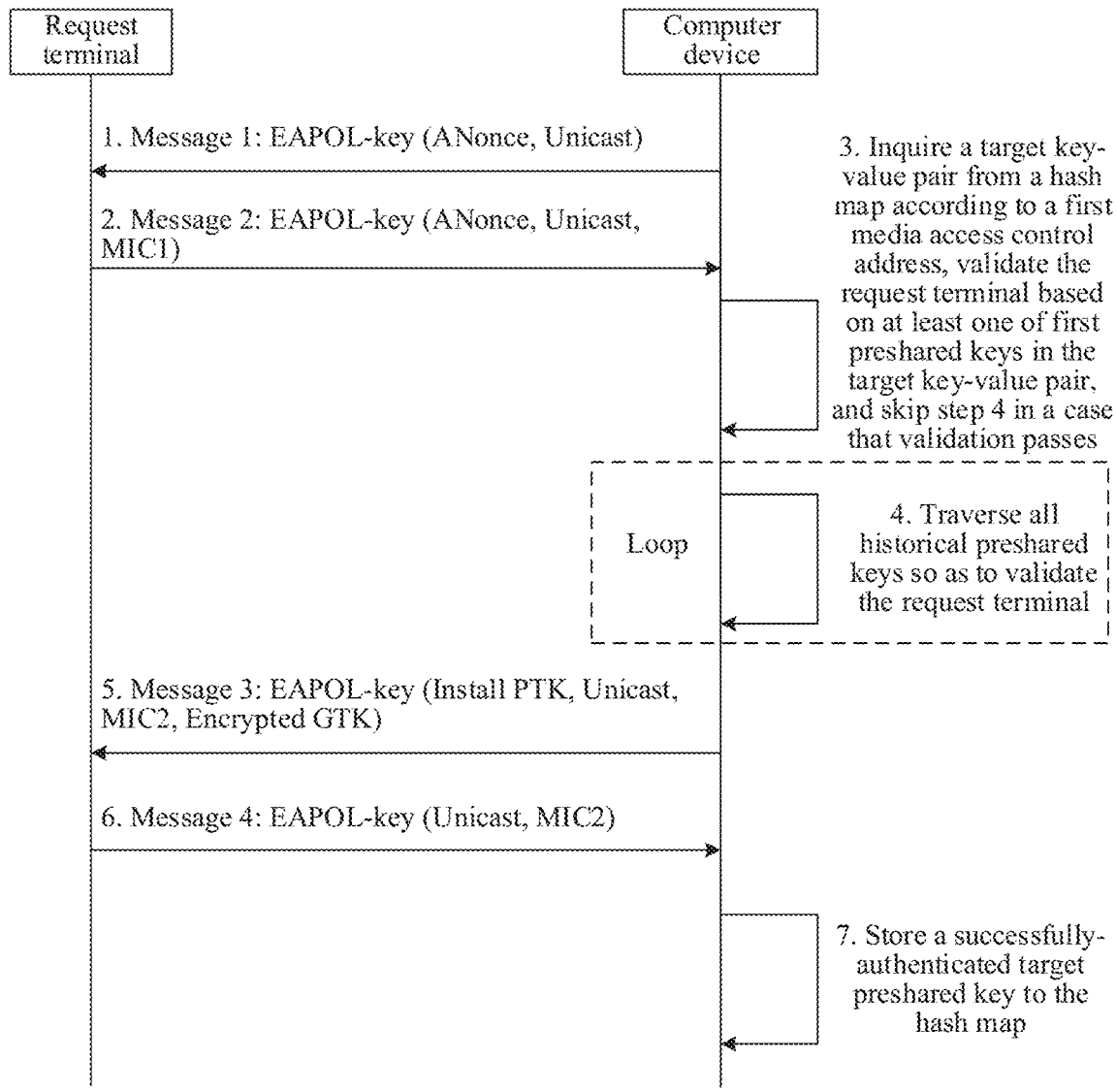
FIG. 9 is a schematic interaction diagram of authentication on a request terminal by a computer device provided by an embodiment of the disclosure.

To facilitate description, a mutual authentication process of the computer device and the request terminal during an EAPOL 4-way handshake is exemplarily described in combination with FIG. 8 to FIG. 9 below. FIG. 8 is a schematic interface diagram of authentication on a request terminal by a computer device provided by an embodiment of the disclosure. As shown in 8a in FIG. 8, the computer device may acquire 4-way handshake messages such as Message 1 to Message 4. Message 1 to Message 4 herein have an EAPOL-key frame data format. FIG. 9 is a schematic interaction diagram of authentication on a request terminal by a computer device provided by an embodiment of the disclosure. As shown in FIG. 9, the computer device may generate second random numbers (ANonce) and transmits Message 1 to the request terminal. As shown in 8b in FIG. 8, Message 1 may carry the second random numbers being unicast data frames. After receiving Message 1, the request terminal may calculate the pairwise master key based on the service set identifier and the preshared keys connected by the request terminal to generate the first random numbers (SNonce), and perform key derivation on the pairwise master key, the first random numbers, the second random numbers, the first media access control address and the second media access control address of the computer device based on the pseudo random function to obtain the PTK. At the time, the request terminal may determine the key confirmation key from the PTK, and encrypts the PTK through an advanced encryption standard (AES) algorithm based on the key confirmation key to obtain the first message integrity code (such as MIC1). For example, the request terminal may take at least a part (such as first 128 bits) in the PTK as key confirmation keys for KCK encryption. After receiving the first message integrity code MIC1, the request terminal may transmit the authentication request (such as Message 2) to the computer device. As shown in 8c in FIG. 8, Message 2 may carry the first random numbers and the first message integrity code (such as MIC1). The first random numbers and the first message integrity code are unicast data frames.

After receiving Message 2, the computer device may inquire the target key-value pair (such as the key-value pair 1) from the multiple key-value pairs stored in the hash map (such as the hash map 1) based on the first media access control address, and acquire at least one first preshared key (such as PSK1, PSK2 and PSK3) corresponding to the first media access control address from the target key-value pair. At the time, the computer device may determine the target pairwise master key (such as a target pairwise master key 1, a target pairwise master key 2 or a target pairwise master key 3) corresponding to any first preshared key based on any first preshared key (such as PSK1, PSK2 or PSK3) and the service set identifier, and determines the target pairwise transient key (such as a target pairwise transient key 1, a target pairwise transient key 2 or a target pairwise transient key 3) corresponding to any first preshared key based on the target pairwise master key, the first random numbers, the second random numbers, the first media access control address and the second media access control address of the computer device. PSK1 corresponds to the target pairwise master key 1 and the target pairwise transient key 1. PSK2 corresponds to the target pairwise master key 2 and the target pairwise transient key 2. PSK3 corresponds to the target pairwise master key 3 and the target pairwise transient key 3. The computer device may encrypt the target pairwise transient key corresponding to any first preshared key to obtain the second message integrity code corresponding to any first preshared key, thereby obtaining the second message integrity codes (such as a second message integrity code 1, a second message integrity code 2 and a second message integrity code 3) corresponding to the first preshared keys. PSK1 corresponds to the second message integrity code 1. PSK2 corresponds to the second message integrity code 2. PSK3 corresponds to the second message integrity code 3.

When the computer device inquires the target message integrity code (such as the second message integrity code 2 being MIC2 for short) the same as MIC1 from the second message integrity code 1, the second message integrity code 2 and the second message integrity code 3, it is determined that request terminal validation passes (namely, the pairwise master key of the request terminal is correct). At the time, the computer device may generate a group master key (GMK), perform key derivation on the group master key, the second random numbers and the second media access control address of the computer device through the pseudo random function to obtain a group transient key (GTK), determine a key encryption key (KEK) from the target pairwise transient key 2 for generating MIC2, and encrypt the GTK to obtain an encrypted GTK through the AES algorithm based on the key encryption key. For example, the computer device may take at least a part (such as middle 128 bits) in the target pairwise transient key 2 as the key encryption key for KEK encryption. The computer device may transmit a validation request (such as Message 3) to the request terminal. As shown in 8*d* in FIG. 8, Message 3 may carry the target message integrity code (such as MIC2) and may also carry an instruction for installing the PTK and the encrypted group transient key. The instruction, the target message integrity code and the encrypted group transient key are unicast data frames.

After receiving Message 3, the request terminal may determine that the target pairwise master key 2 of the computer device is correct and transmits an authentication confirmation message (such as Message 4) to the computer device when MIC2 and MIC1 are the same. As shown in 8*e* in FIG. 8, Message 4 may carry the target message integrity code which is a unicast data frame. After receiving Message 4, the computer device may determine successful request terminal authentication when MIC2 in Message 4 is the same as MIC2 before Message 3 transmitting. On the contrary, when MIC2 in Message 4 is different from MIC2 before Message 3 transmitting, the computer device may determine that MIC2 is tampered or loses several data in a transmitting process, thereby determining that request terminal authentication fails. In some example embodiments, when no target message integrity code the same as MIC1 is inquired from a second message integrity code 1, a second message integrity code 2 and a second message integrity code 3, a computer device may traverse various historical preshared keys from a key-value pair 1 to a key-value pair 3 and generate third message integrity codes corresponding to the historical preshared keys. When a target message integrity code the same as MIC1 is inquired from the third message integrity codes, the computer device determines that request terminal validation passes and adds the preshared key connected by the request terminal to the key-value pair 1 in a hash map 1 so as to update the hash map 1 in real time when request terminal authentication succeeds.

When request terminal authentication succeeds, the request terminal may take middle 128 bits in the PTK as the key decryption key for KEK decryption, decrypts the encrypted GTK based on the key decryption key to obtain the GTK, and then may install the GTK and the PTK. Meanwhile, the computer device may also install the target pairwise transient key 2 which is the same as the PTK. After the request terminal and the computer device finish authentication, the computer device may open a control port, and the request terminal may communicate with the computer device through the control port, thereby enabling 802.11 data frames (such as unicast data frames, multicast data frames or broadcast data frames) in the communication process to normally pass. It is to be understood that the PTK may be used for protecting the unicast data frames in the communication process to enable the unicast data frames to normally pass. The GTK is used for protecting the multicast data frames and the broadcast data frames in the communication process to enable the multicast data frames and the broadcast data frames to normally pass so that a key and information of the user may be prevented from being stolen by illegal users, and safety is improved.

In the embodiment of the disclosure, the computer device may determine the target key-value pair from the multiple pre-stored key-value pairs according to the first media access control address of the request terminal when receiving the authentication request of the request terminal, determine at least one first preshared key corresponding to the first media access control address from the target key-value pair, and accordingly, rapidly search for all first preshared keys which have been connected by the request terminal based on the first media access control address so as to perform high-efficiency authentication on the request terminal. The computer device may generate the second message integrity codes corresponding to the first preshared keys and authenticate the request terminal based on the first message integrity code and the second message integrity codes, thereby improving authentication efficiency and the user experience degree.

Figure 10:
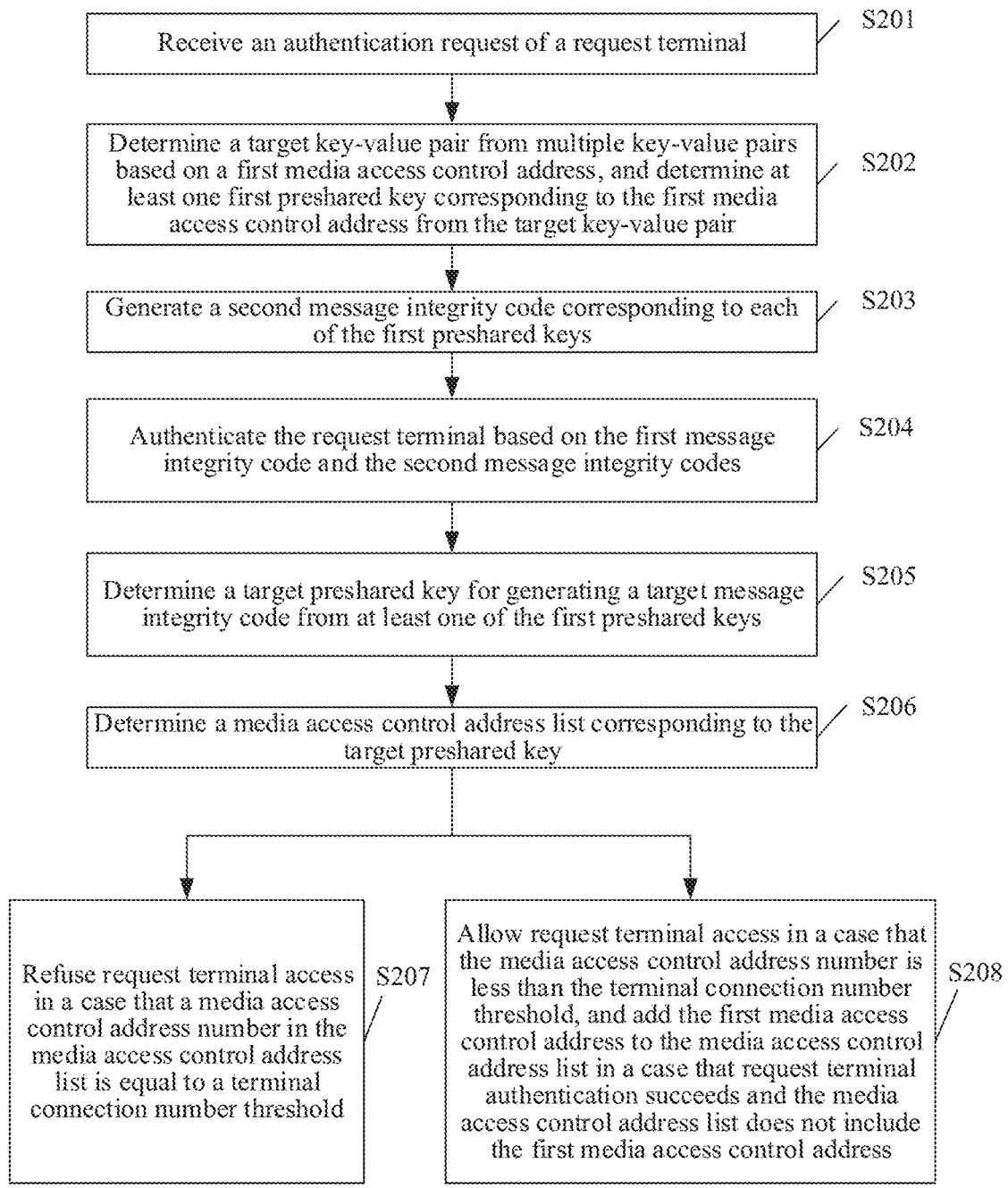
FIG. 10 is a schematic flowchart of a method for authenticating a terminal provided by an embodiment of the disclosure.

FIG. 10 is a schematic flowchart of a method for authenticating a terminal provided by an embodiment of the disclosure. The method for authenticating a terminal may be achieved by a computer device and may include the following S201 to S208:

S201: Receive an authentication request of a request terminal.

S202: Determine a target key-value pair from multiple key-value pairs based on a first media access control address, and determine at least one first preshared key corresponding to the first media access control address from the target key-value pair.

S203: Generate a second message integrity code corresponding to each of the first preshared keys.

S204: Authenticate the request terminal based on the first message integrity code and the second message integrity codes.

Reference may be made to description on S101 to S104 in the embodiment corresponding to FIG. 4 for implementation modes of S201 to S204.

S205: Determine a target preshared key for generating a target message integrity code from at least one of the first preshared keys.

In some example embodiments, for example, at least one of the first preshared keys includes PSK1, PSK2 and PSK3. Accordingly, after determining that request terminal validation passes, a computer device may determine a target preshared key (such as PSK2) for generating a target message integrity code (such as MIC2) from PSK1, PSK2 and PSK3.

S206: Determine a media access control address list corresponding to the target preshared key.

In some example embodiments, a computer device may store media access control addresses of all terminals which have been connected by historical successfully-authenticated preshared keys (such as the above historical preshared keys or the target preshared key). For example, the computer device may store media access control address lists which have been connected by the historical successfully-authenticated preshared keys in an internal memory. The media access control address lists herein may include the media access control addresses of all the terminals which have been connected by the historical successfully-authenticated preshared keys. One historical successfully-authenticated preshared key corresponds to one media access control address list. The computer device may determine the media access control address list corresponding to the target preshared key from the media access control address lists corresponding to the historical successfully-authenticated preshared keys, and then determine the media access control address number (namely, the number of the media access control addresses) in the media access control address list.

S207: Refuse request terminal access in a case that the media access control address number in the media access control address list is equal to a terminal connection number threshold.

Figures 11, 12:
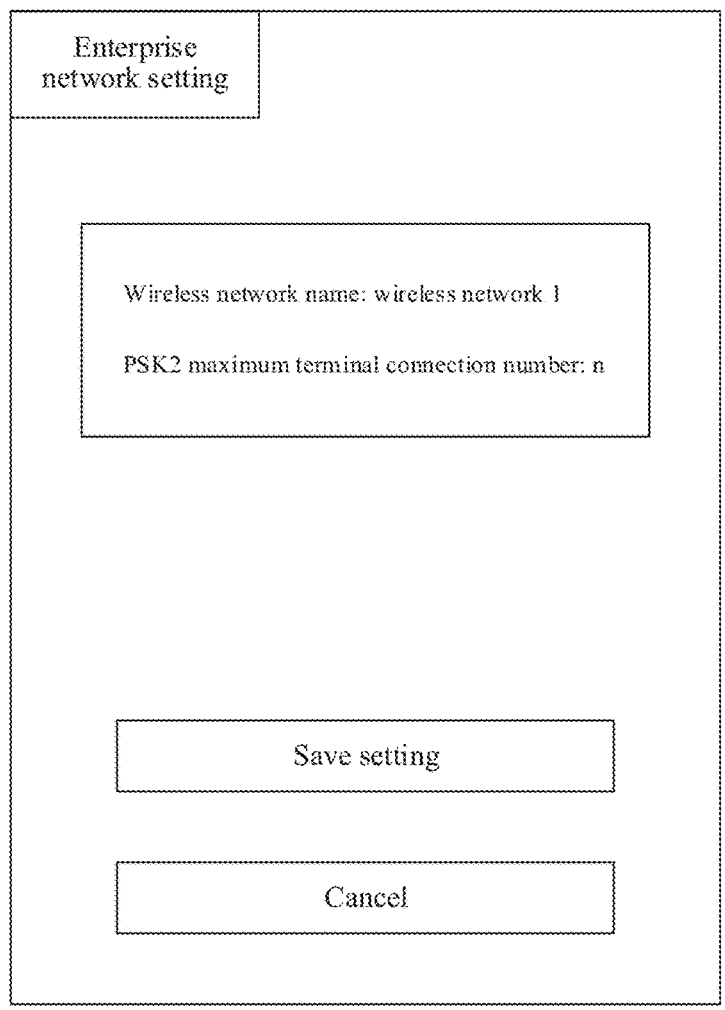
FIG. 11 is a schematic interface diagram of determining a maximum terminal connection number provided by an embodiment of the disclosure.
FIG. 12 is a schematic diagram of storing key-value pairs by a hash map provided by an embodiment of the disclosure.

In some example embodiments, a computer device may directly determine a terminal connection number threshold and may also determine or call the terminal connection number threshold from an internal memory or a database. The terminal connection number threshold may be understood as a maximum connection number of the terminals which may be connected by one preshared key (namely, the maximum number of the terminals limited to be connected by the preshared key), and the maximum terminal connection number may be a value set by the user or a default set by the computer device. To facilitate description, a determining process of the maximum terminal connection number is described in combination with an enterprise office WiFi application scenario. FIG. 11 is a schematic interface diagram of determining a maximum terminal connection number provided by an embodiment of the disclosure. As shown in FIG. 11, the computer device (such as a terminal corresponding to an enterprise administrator) may configure and store the maximum terminal connection number (such as n which may be a positive integer, such as 10 or other values) corresponding to the historical successfully-authenticated preshared key (such as the target PSK2) in an enterprise network (such as a wireless network 1) through a mini program or application (APP). After the maximum terminal connection number n is determined, the computer device may refuse request terminal access and determine that request terminal authentication fails when the media access control address number in the media access control address list is equal to the maximum terminal connection number n. A hash map is stored in the internal memory of the computer device, a too large number of terminals connected by the computer device will cause too many hash keys in the hash map, which increases a hash conflict probability, and thus, the computer device may refuse request terminal access when the media access control address number is equal to the maximum terminal connection number, thereby optimizing the hash map and reducing the hash conflict probability.

S208: Allow request terminal access in a case that the media access control address number is less than the terminal connection number threshold, and add the first media access control address to the media access control address list in a case that request terminal authentication succeeds and the media access control address list does not include the first media access control address.

In some example embodiments, after request terminal access is allowed, when request terminal authentication succeeds, a computer device may determine a first media access control address as a historical successfully-authenticated address of a request terminal, and add the first media access control address to a media access control address list so as to update the media access control address list in real time when the media access control address list does not include the first media access control address.

In some example embodiments, a computer device may store connection time of historical preshared keys in key-value pairs. For example, the computer device may store the connection time of the historical preshared keys in the key-value pairs in a hash map. The connection time herein may be understood as the last time when the terminal is connected with the historical preshared keys, and may also be understood as the time, being closest to the current time, when the terminal is connected with the historical preshared keys. FIG. 12 is a schematic diagram of storing key-value pairs by a hash map provided by an embodiment of the disclosure. As shown in FIG. 12, the hash map (such as a hash map 2) may store the multiple key-value pairs (such as a key-value pair 10 to a key-value pair 30). The computer device may store the connection time (such as connection time 1 to connection time 3) corresponding to the historical preshared keys (such as PSK1 to PSK3) in the key-value pair 10. The connection time (such as connection time 4 to connection time 8) corresponding to the historical preshared keys (such as PSK4 to PSK8) may be stored in the key-value pair 20. The connection time (such as connection time 9) corresponding to each of the historical preshared keys (such as PSK0) may be stored in the key-value pair 30. The computer device may traverse all the key-value pairs, determine a difference value between the connection time of each historical preshared key in the traversed key-value pair and current time to serve as a connection time difference value, then, determine second preshared keys with the connection time difference values greater than a connection time threshold from the historical preshared keys, and delete the second preshared keys from the traversed key-value pair. One historical preshared key corresponds to one connection time difference value. The connection time threshold herein may be a value set by the user or a default configured by the computer device. The embodiment of the disclosure may generally call the historical preshared keys with the connection time difference values greater than the connection time threshold in the key-value pairs as the second preshared keys. In some example embodiments, a computer device may determine a connection time threshold, additionally start a timer in a hash map, periodically traverse multiple key-value pairs in the hash map based on the timer so as to periodically delete second preshared keys in the multiple key-value pairs, thereby reducing an internal memory occupied by the hash map, and applicability is higher.

Figure 13:
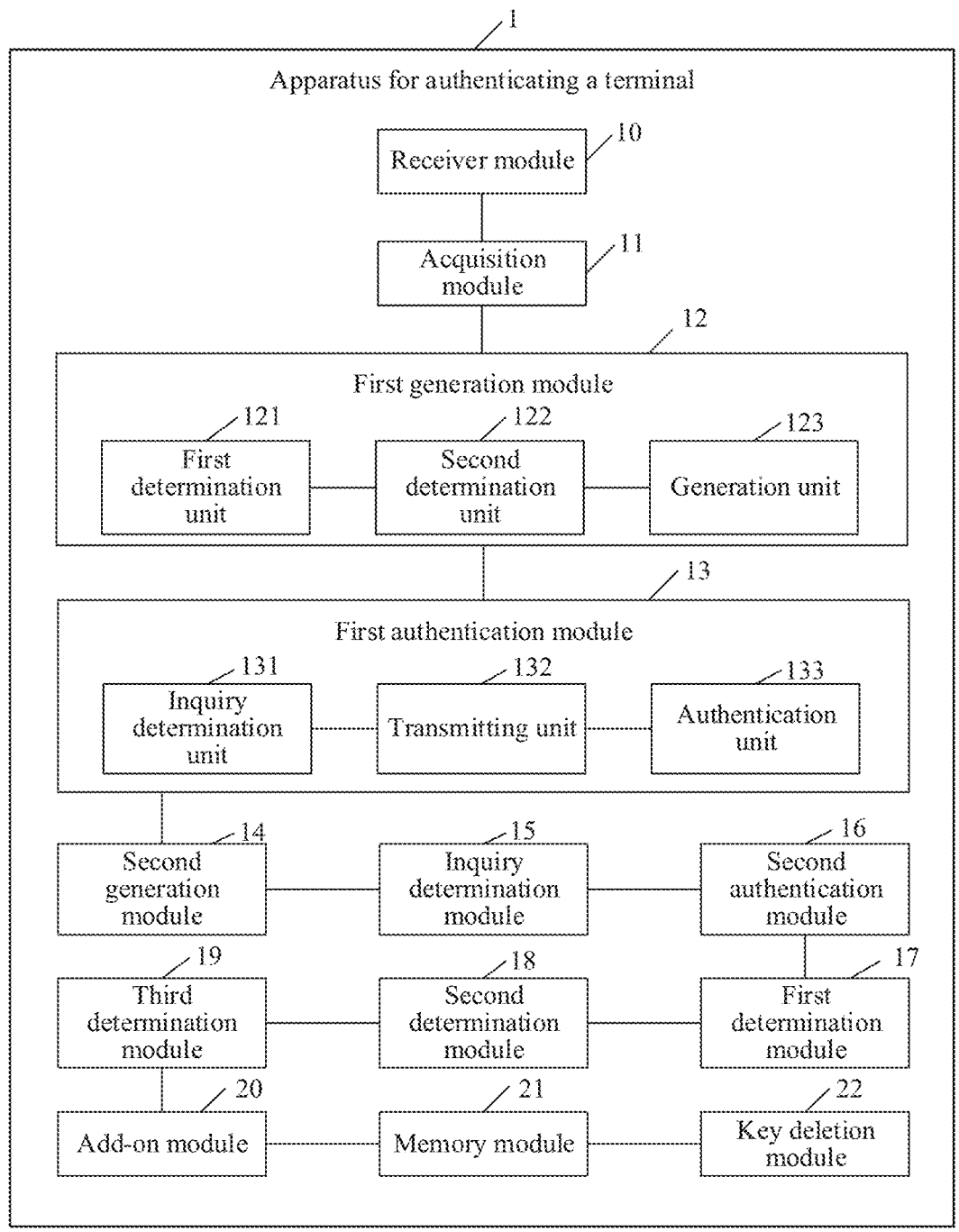
FIG. 13 is a schematic structural diagram of an apparatus for authenticating a terminal provided by an embodiment of the disclosure.

FIG. 13 is a schematic structural diagram of an apparatus for authenticating a terminal provided by an embodiment of the disclosure. The apparatus for authenticating a terminal may be a computer program (including a program instruction) running in the computer device. For example, the apparatus for authenticating a terminal is application software. The apparatus for authenticating a terminal may be configured to execute corresponding operations in the method for authenticating a terminal according to the embodiment of the disclosure. As shown in FIG. 13, the apparatus 1 for authenticating a terminal may run on the computer device, and the computer device may be the computer device 10 in the embodiment corresponding to FIG. 3. The apparatus 1 for authenticating a terminal may include: a receiver module 10, an acquisition module 11, a first generation module 12, a first authentication module 13, a second generation module 14, an inquiry determination module 15, a second authentication module 16, a first determination module 17, a second determination module 18, a third determination module 19, an add-on module 20, a memory module 21 and a key deletion module 22.

The receiver module 10 is configured to receive an authentication request of a request terminal, the authentication request carrying a first media access control address and a first message integrity code of the request terminal. The acquisition module 11 is configured to determine a target key-value pair from multiple key-value pairs based on the first media access control address, and determine at least one first preshared key corresponding to the first media access control address from the target key-value pair, any of the key-value pair including a media access control address of one terminal and at least one historical preshared key which has been connected by the terminal, and the terminal media access control address in any of the key-value pairs being a historical successfully-authenticated address. The first generation module 12 is configured to generate a second message integrity code corresponding to each of the first preshared keys, one first preshared key corresponding to one second message integrity code. the first authentication module 13 is configured to authenticate the request terminal based on the first message integrity code and the second message integrity codes.

In some example embodiments, the authentication request further carries first random numbers generated by the request terminal. The first generation module 12 includes: a first determination unit 121, a second determination unit 122 and a generation unit 123. The first determination unit 121 is configured to determine a target pairwise master key corresponding to any of the first preshared keys based on any of the first preshared keys and a service set identifier, the service set identifier being an identifier of a service set requested to be connected by the request terminal. The second determination unit 122 is configured to determine a target pairwise transient key corresponding to any of the first preshared keys based on the target pairwise master key, the first random numbers, second random numbers, the first media access control address and a second media access control address of the computer device. The generation unit 123 is configured to encrypt the target pairwise transient key to obtain a second message integrity code corresponding to any of the first preshared keys. Reference may be made to description on S103 in the embodiment corresponding to FIG. 4 for achieving modes of the first determination unit 121, the second determination unit 122 and the generation unit 123.

In some example embodiments, a first authentication module 13 includes: an inquiry determination unit 131, a transmitting unit 132 and an authentication unit 133. The inquiry determination unit 131 is configured to determine that request terminal validation passes when a target message integrity code the same as a first message integrity code is inquired from each of the second message integrity codes. The transmitting unit 132 is configured to transmit a validation request to the request terminal, the validation request carrying the target message integrity code. The authentication unit 133 is configured to determine that request terminal authentication succeeds in a case that an authentication confirmation message transmitted by the request terminal is received, the authentication confirmation message being transmitted by the request terminal in response to determining that the target message integrity code is the same as the first message integrity code. Reference may be made to description on S104 in the embodiment corresponding to FIG. 4 for achieving modes of the inquiry determination unit 131, the transmitting unit 132 and the authentication unit 133.

In some example embodiments, the above apparatus 1 for authenticating a terminal further includes: a second generation module 14, configured to generate third message integrity codes corresponding to historical preshared keys in the key-value pairs in a case that no target message integrity code the same as the first message integrity code is inquired from each of second message integrity codes, one historical preshared key corresponding to one third message integrity code; an inquiry determination module 15, configured to determine that request terminal validation passes in a case that a target message integrity code the same as the first message integrity code is inquired from each of the third message integrity codes; and a second authentication module 16, configured to determine that request terminal authentication fails in a case that no target message integrity code the same as the first message integrity code is inquired from each of the third message integrity codes.

In some example embodiments, the above apparatus 1 for authenticating a terminal further includes: a first determination module 17, configured to determine a target preshared key for generating a target message integrity code from at least one of the first preshared keys; a second determination module 18, configured to determine a media access control address list corresponding to the target preshared key; and a third determination module 19, configured to refuse request terminal access in a case that the media access control address number is equal to the terminal connection number threshold.

In some example embodiments, the above apparatus 1 for authenticating a terminal further includes: an add-on module 20, configured to allow request terminal access in a case that the media access control address number is less than the terminal connection number threshold, and add the first media access control address to the media access control address list to serve as a historical successfully-authenticated address of the request terminal in a case that request terminal authentication succeeds and the media access control address list does not include the first media access control address.

In some example embodiments, the above apparatus 1 for authenticating a terminal further includes: a memory module 21, configured to store connection time of historical preshared keys in each of the key-value pairs; and a key deletion module 22, configured to determine second preshared keys with connection time difference values greater than a connection time threshold from the historical preshared keys in any of the key-value pairs, and delete the second preshared keys from any of the key-value pairs. The connection time difference value of any of the historical preshared keys represents a difference value between the connection time of any of the historical preshared keys and current time. Reference may be made to description on S101 to S104 in the embodiment corresponding to FIG. 4 or S201 to S208 in the embodiment corresponding to FIG. 10 for achieving modes of the receiver module 10, the acquisition module 11, the first generation module 12, the first authentication module 13, the second generation module 14, the inquiry determination module 15, the second authentication module 16, the first determination module 17, the second determination module 18, the third determination module 19, the add-on module 20, the memory module 21 and the key deletion module 22.

Figure 14:
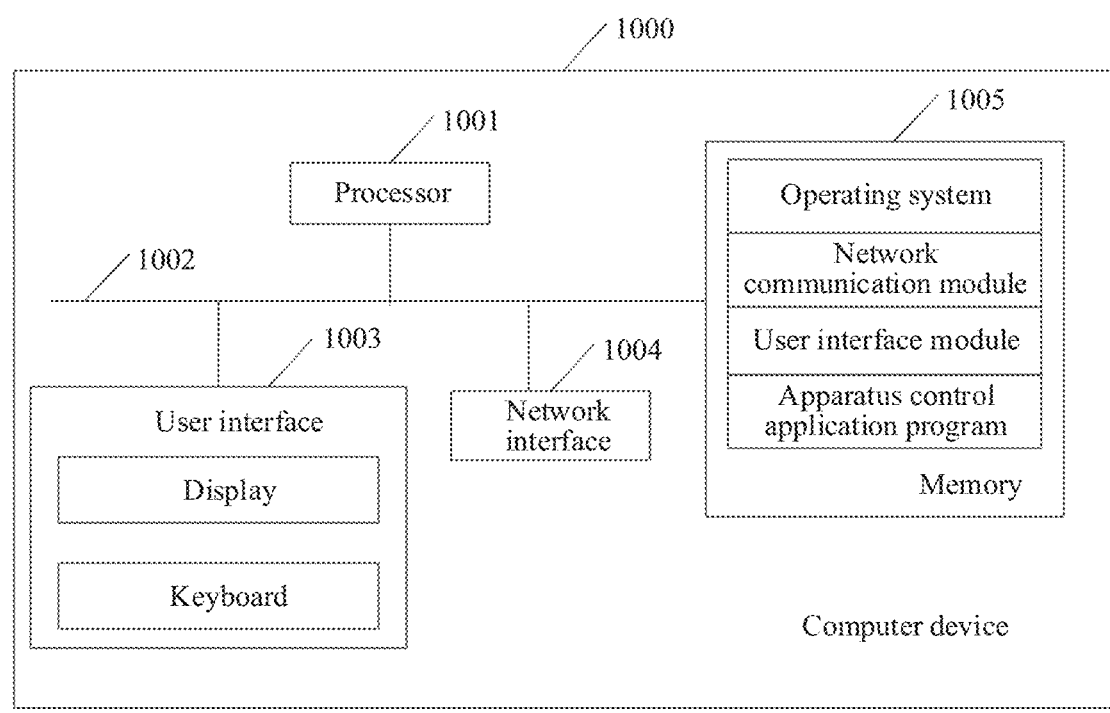
FIG. 14 is a schematic structural diagram of a computer device provided by an embodiment of the disclosure.

FIG. 14 is a schematic structural diagram of a computer device provided by an embodiment of the disclosure. As shown in FIG. 14, the computer device 1000 may be a computer device 10 in the embodiment corresponding to FIG. 3, and the computer device 1000 may include: at least one processor 1001, for example, a CPU, at least one network interface 1004, a user interface 1003, a memory 1005, and at least one communications bus 1002. The communications bus 1002 is configured to implement connection and communication between the components. The user interface 1003 may include a display, a keyboard, and optionally, the network interface 1004 may include a standard wired interface and a standard wireless interface (for example, a WiFi interface). The memory 1005 may include a high-speed random access memory (RAM), and may further include a non-volatile memory, for example, at least one magnetic disk storage. The memory 1005 may further be at least one storage apparatus that is located far away from the processor 1001. As shown in FIG. 14, the memory 1005 used as a computer storage medium may include an operating system, a network communication module, a user interface module, and a device-control application program.

In the computer device 1000 shown in FIG. 14, the network interface 1004 is mainly configured to perform network communication with the request terminal. The user interface 1003 is mainly configured to provide an input interface for a user. The processor 1001 may be configured to call (execute) an apparatus control application program stored in the memory 1005 so as to: receive an authentication request of a request terminal, the authentication request carrying a first media access control address and a first message integrity code of the request terminal; determine a target key-value pair from multiple key-value pairs based on the first media access control address, and determine at least one first preshared key corresponding to the first media access control address from the target key-value pair, any of the key-value pairs including a media access control address of one terminal and at least one historical preshared key which has been connected by the terminal, and the terminal media access control address in any of the key-value pairs being a historical successfully-authenticated address; generate a second message integrity code corresponding to each of the first preshared keys, one first preshared key corresponding to one second message integrity code; and authenticate the request terminal based on the first message integrity code and the second message integrity codes.

It is to be understood that, the computer device 1000 described in this embodiment of the disclosure may implement the descriptions of the method for authenticating a terminal in the embodiments corresponding to FIG. 4 and FIG. 10, or the descriptions of the apparatus 1 for authenticating a terminal in the embodiment corresponding to FIG. 13.

In addition, it is to be indicated that: an embodiment of the disclosure further provides a computer-readable storage medium. The computer-readable storage medium stores a computer program executed by the terminal authentication apparatus 1 mentioned above, and the computer program includes a program instruction (a computer instruction). When executing the program instruction, the processor may implement the descriptions of the method for authenticating a terminal in the embodiment corresponding to FIG. 4 or FIG. 10. For technical details that are not disclosed in the embodiments of the computer-readable storage medium of the disclosure, refer to the method embodiments of the disclosure. In an example, the program instructions may be deployed to be executed on a computer device, or deployed to be executed on a plurality of computer devices at the same location, or deployed to be executed on a plurality of computer devices that are distributed in a plurality of locations and interconnected by using a communication network. The plurality of computer devices that are distributed in the plurality of locations and interconnected by using the communication network may form a blockchain system According to an aspect of the embodiments of the disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to implement the method for authenticating a terminal according to the embodiment of the disclosure.

A person of ordinary skill in the art may understand that all or some of the procedures of the methods in the embodiments may be implemented by using a computer program instructing relevant hardware. The computer program may be stored in a computer-readable storage medium. When the computer program runs, the procedures of the methods in the embodiments are performed. The storage medium may be a magnetic disk, an optical disc, a read-only memory (ROM), a RAM, or the like.

The computer-readable storage medium may be an apparatus for authenticating a terminal provided in any one of the foregoing embodiments or an internal storage unit of the computer device, for example, a hard disk or a main memory of the terminal. The computer-readable storage medium may alternatively be an external storage device of the computer device, for example, a removable hard disk, a smart memory card (SMC), a secure digital (SD) card, or a flash card equipped on the computer device. The computer-readable storage medium may further include a magnetic disk, an optical disc, a ROM, a RAM, or the like. the computer-readable storage medium may further include both an internal storage unit and an external storage device of the computer device. The computer-readable storage medium is configured to store the computer program and another program and data that are required by the computer device. The computer-readable storage medium may further be configured to temporarily store data that has been output or data to be output.

In the claims, specification, and accompanying drawings of the disclosure, the terms "first", "second", or the like are intended to distinguish between different objects but do not indicate a particular order. In addition, terminologies "comprise", "have", and any variations thereof are intended to indicate non-exclusive inclusion. For example, a process, method, system, product, or device that comprises a series of operations or units is not limited to the listed operations or units; and instead, further optionally comprises an operation or unit that is not listed, or further optionally comprises another operation or unit that is intrinsic to the process, method, product, or device. "Embodiment" mentioned in this specification means that particular features, structures, or characteristics described with reference to the embodiment may be included in at least one embodiment of the disclosure. The term appearing at different positions of the specification may not refer to the same embodiment or an independent or alternative embodiment that is mutually exclusive with another embodiment. A person skilled in the art explicitly or implicitly understands that the embodiments described in this specification may be combined with other embodiments.

A person of ordinary skill in the art may be aware that, in combination with examples of units and algorithm operations described in the embodiments disclosed in this specification, the disclosure may be implemented by using electronic hardware, computer software, or a combination thereof. To clearly describe interchangeability between the hardware and the software, compositions and operations of each example have been generally described according to functions in the foregoing descriptions. A person skilled in the art may use different methods to implement the described functions for each particular application, but it should not be considered that the implementation goes beyond the scope of the disclosure. What is disclosed above is merely exemplary embodiments of the disclosure, and certainly is not intended to limit the protection scope of the disclosure. Therefore, equivalent variations made in accordance with the claims of the disclosure shall fall within the scope of the disclosure.

What is claimed is:

1. A method for authenticating a terminal, executed by a computer device, comprising:
   receiving an authentication request of a request terminal, the authentication request including a first media access control address and a first message integrity code of the request terminal;
   determining a target key-value pair from a plurality of key-value pairs based on the first media access control address, and determining at least one first preshared key corresponding to the first media access control address from the target key-value pair, any of the plurality of key-value pairs comprising a media access control address of a terminal and at least one historical preshared key which has been connected by the terminal, and the media access control address of the terminal in any of the plurality of key-value pairs being a historical successfully-authenticated address;
   generating at least one second message integrity code corresponding to each of the at least one first preshared key, one first preshared key corresponding to one second message integrity code; and
   authenticating the request terminal based on the first message integrity code and the at least one second message integrity code.

2. The method according to claim 1, wherein the authentication request further includes first random numbers generated by the request terminal; and
   the generating the at least one second message integrity code comprises:
   determining a target pairwise master key corresponding to any of the at least one first preshared key based on any of the at least one first preshared key and a service set identifier, the service set identifier being an identifier of a service set requested to be connected by the request terminal;
   determining a target pairwise transient key corresponding to any of the at least one first preshared key based on the target pairwise master key, the first random numbers, second random numbers, the first media access control address and a second media access control address of the computer device; and
   encrypting the target pairwise transient key to obtain a second message integrity code corresponding to any of the at least one first preshared key.

3. The method according to claim 2, wherein the authenticating the request terminal comprises:
   determining that request terminal validation passes based on a target message integrity code the same as the first message integrity code being inquired from each of the at least one second message integrity code, and transmitting a validation request to the request terminal, the validation request including the target message integrity code; and
   determining that request terminal authentication succeeds based on an authentication confirmation message being received from the request terminal, the authentication confirmation message being received from the request terminal in response to determining that the target message integrity code is the same as the first message integrity code.

4. The method according to claim 3, further comprising, in response to determining that the request terminal validation passes:
   determining a target preshared key for generating the target message integrity code from at least one of the at least one first preshared key;
   determining a media access control address list corresponding to the target preshared key; and
   determining whether request terminal access is allowed or not according to a quantitative relation between a media access control address number in the media access control address list and a terminal connection number threshold.

5. The method according to claim 4, wherein the determining whether the request terminal access is allowed or not comprises:
   refusing the request terminal access based on the media access control address number being equal to the terminal connection number threshold; and
   allowing the request terminal access based on the media access control address number being less than the terminal connection number threshold.

6. The method according to claim 5, further comprising, based on the media access control address number being less than the terminal connection number threshold:
   adding the first media access control address to the media access control address list to serve as a historical successfully-authenticated address of the request terminal, based on a determination that the request terminal authentication succeeds and the media access control address list does not include the first media access control address.

7. The method according to claim 3, wherein the determining that the request terminal authentication succeeds comprises:
  determining that the request terminal authentication succeeds based on a target message integrity code in the authentication confirmation message being the same as the target message integrity code inquired from each of the at least one second message integrity code; and
the method further comprises:
  determining that the request terminal authentication fails based on the target message integrity code in the authentication confirmation message being different from the target message integrity code inquired from each of the at least one second message integrity code.

8. The method according to claim 3, further comprising, in response to determining that the request terminal validation passes:
  generating a group master key;
  determining a group transient key based on the group master key, the second random numbers and the second media access control address;
  determining a key encryption key in the target pairwise transient key; and
  encrypting the group transient key based on the key encryption key to obtain an encrypted group transient key,
  the encrypted group transient key being transmitted to the request terminal and used in decrypting the encrypted group transient key to obtain the group transient key,
  the target pairwise transient key being used for protecting a unicast data frame in a communication process with the request terminal, the group transient key being used for protecting a multicast data frame and a broadcast data frame in the communication process, and the communication process occurring after the request terminal authentication succeeds.

9. The method according to claim 2, wherein the authenticating the request terminal comprises:
  generating third message integrity codes corresponding to historical preshared keys in the plurality of key-value pairs based on no target message integrity code the same as the first message integrity code is inquired from each of the at least one second message integrity code, one historical preshared key corresponding to one third message integrity code; and
  determining that request terminal authentication fails based on no target message integrity code the same as the first message integrity code being inquired from each of the third message integrity codes.

10. The method according to claim 9, further comprising:
  determining that request terminal validation passes based on the target message integrity code the same as the first message integrity code is inquired from each of the third message integrity codes, and transmitting a validation request to the request terminal, the validation request including the target message integrity code; and
  determining that the request terminal authentication succeeds based on an authentication confirmation message transmitted by the request terminal being received, the authentication confirmation message being transmitted by the request terminal in response to determining that the target message integrity code is the same as the first message integrity code.

11. The method according to claim 10, further comprising, in response to determining that the request terminal authentication succeeds:
  determining a target preshared key for generating the target message integrity code from at least one of the at least one first preshared key; and
  adding the target preshared key to the target key-value pair.

12. The method according to claim 2, wherein the encrypting the target pairwise transient key comprises:
  determining a key confirmation key in the target pairwise transient key; and
  encrypting the target pairwise transient key based on the key confirmation key to obtain the second message integrity code corresponding to any of the at least one first preshared key.

13. The method according to claim 2, further comprising, prior to the receiving the authentication request of the request terminal:
  transmitting, to the request terminal, the second random numbers upon which the first message integrity code is determined.

14. The method according to claim 1, wherein each of the plurality of key-value pairs stores connection times of historical preshared keys, and the method further comprises performing the following operations for any of the plurality of key-value pairs:
  determining second preshared keys with connection time difference values greater than a connection time threshold from historical preshared keys in any of the plurality of key-value pairs, and deleting the second preshared keys from any of the plurality of key-value pairs,
  a connection time difference value of any of the historical preshared keys representing a difference value between a connection time of any of the historical preshared keys and current time.

15. A computer device, comprising: a processor, a memory, and a network interface;
  the processor being connected to the memory and the network interface, the network interface being configured to provide a data communication function, the memory being configured to store program instructions, and the processor being configured to perform the program instructions to implement the method for authenticating a terminal according to claim 1.

16. An apparatus for authenticating a terminal, comprising:
  at least one memory configured to store program code; and
  at least one processor configured to read the program code and operate as instructed by the program code, the program code comprising:
  receiver code configured to cause the at least one processor to receive an authentication request of a request terminal, the authentication request including a first media access control address and a first message integrity code of the request terminal;
  acquisition code configured to cause the at least one processor to determine a target key-value pair from a plurality of key-value pairs based on the first media access control address, and determine at least one first preshared key corresponding to the first media access control address from the target key-value pair, any of the plurality of key-value pairs comprising a media access control address of a terminal and at least one historical preshared key which has been connected by the terminal, and the media access control address of the terminal in any of the plurality of key-value pairs being a historical successfully-authenticated address;

generation code configured to cause the at least one processor to generate at least one second message integrity code corresponding to each of the at least one first preshared key, one first preshared key corresponding to one second message integrity code; and authentication code configured to cause the at least one processor to authenticate the request terminal based on the first message integrity code and the at least one second message integrity codes.

17. The apparatus according to claim 16, wherein the authentication request further includes first random numbers generated by the request terminal; and the generation code comprises:

first determining sub-code configured to cause the at least one processor to determine a target pairwise master key corresponding to any of the at least one first preshared key based on any of the at least one first preshared key and a service set identifier, the service set identifier being an identifier of a service set requested to be connected by the request terminal;

second determining sub-code configured to cause the at least one processor to generate a target pairwise transient key corresponding to any of the at least one first preshared key based on the target pairwise master key, the first random numbers, second random numbers, the first media access control address and a second media access control address of the apparatus; and encrypting sub-code configured to cause the at least one processor to encrypt the target pairwise transient key to obtain a second message integrity code corresponding to any of the at least one first preshared key.

18. The apparatus according to claim 16, wherein the authentication code comprises:

third determining sub-code configured to cause the at least one processor to determine that request terminal validation passes based on a target message integrity code the same as the first message integrity code being inquired from each of the at least one second message integrity code, and transmit a validation request to the request terminal, the validation request including the target message integrity code; and fourth determining sub-code configured to cause the at least one processor to determine that request terminal authentication succeeds based on an authentication confirmation message being received from the request terminal, the authentication confirmation message being received from the request terminal in response to determining that the target message integrity code is the same as the first message integrity code.

19. The apparatus according to claim 18, wherein the program code further comprises the following codes that are executed in response to determining that the request terminal validation passes:

first determining code configured to cause the at least one processor to determine a target preshared key for generating the target message integrity code from at least one of the at least one first preshared key;

second determining code configured to cause the at least one processor to determine a media access control address list corresponding to the target preshared key; and third determining code configured to cause the at least one processor to determine whether request terminal access is allowed or not according to a quantitative relation between a media access control address number in the media access control address list and a terminal connection number threshold.

\* \* \* \* \*